(12) United States Patent
Hara et al.

(10) Patent No.: US 8,781,690 B2
(45) Date of Patent: Jul. 15, 2014

(54) BICYCLE SEAT POSITION INDICATOR

(75) Inventors: Nobukatsu Hara, Osaka (JP); Satoshi Kitamura, Nara (JP)

(73) Assignee: Shimano Inc., Osaka (JP)

( * ) Notice: Subject to any disclaimer, the term of this patent is extended or adjusted under 35 U.S.C. 154(b) by 145 days.

(21) Appl. No.: 13/304,824

(22) Filed: Nov. 28, 2011

(65) Prior Publication Data

US 2013/0138302 A1 May 30, 2013

(51) Int. Cl.
*B60N 2/02* (2006.01)

(52) U.S. Cl.
CPC .............. *B60N 2/02* (2013.01); *B60N 2/0232* (2013.01); *B60N 2/0248* (2013.01)
USPC ........................................................ 701/49

(58) Field of Classification Search
CPC .............. B62J 1/08; B62J 39/00; B62J 99/00; B62M 7/00; A63B 71/00; A63B 21/00181; A63B 22/01; A63B 24/00; A63B 71/0622; A63B 22/02; A63B 22/16; B60G 17/015; B62K 25/04
USPC ........... 439/669; 297/215.13, 215.14, 215.15; 280/5.5, 259, 283, 287, 288.4, 5.503; 482/4, 8, 56, 57; 340/425.5; 474/70; 33/701; 403/345; 248/408, 631; 180/220; 701/49
See application file for complete search history.

(56) References Cited

U.S. PATENT DOCUMENTS

| | | | | |
|---|---|---|---|---|
| 5,415,422 A | * | 5/1995 | Trammell, Jr. ................ | 280/259 |
| 5,599,244 A | * | 2/1997 | Ethington ........................ | 474/70 |
| 5,681,234 A | * | 10/1997 | Ethington ........................ | 474/70 |
| 5,785,630 A | * | 7/1998 | Bobick et al. ..................... | 482/4 |
| 5,829,733 A | * | 11/1998 | Becker ........................... | 248/631 |
| 5,979,978 A | * | 11/1999 | Olsen et al. ............. | 297/215.15 |
| 6,619,684 B2 | * | 9/2003 | Miyoshi ...................... | 280/283 |
| 7,243,937 B2 | * | 7/2007 | Ishikawa ................... | 280/288.4 |
| 7,714,704 B1 | * | 5/2010 | Mellen ....................... | 340/425.5 |
| 2002/0049122 A1 | * | 4/2002 | Mercado et al. ................ | 482/57 |
| 2002/0185581 A1 | * | 12/2002 | Trask ........................... | 248/408 |
| 2003/0080594 A1 | * | 5/2003 | Geyer et al. ............. | 297/215.13 |
| 2005/0029033 A1 | * | 2/2005 | Rip et al. ..................... | 180/220 |
| 2005/0067863 A1 | * | 3/2005 | Roizen .................... | 297/215.14 |

(Continued)

FOREIGN PATENT DOCUMENTS

JP  2003-116822 A  4/2003

OTHER PUBLICATIONS

U.S. Appl. No. 13/175,980, filed Jul. 5, 2011, Kodama et al.

*Primary Examiner* — Tuan C. To
*Assistant Examiner* — Yuri Kan
(74) *Attorney, Agent, or Firm* — Global IP Counselors

(57) ABSTRACT

A bicycle seat position indicator has a controller and an indicating device. The controller provides an output signal indicative of a current height position of an adjustable bicycle seatpost. The indicating device is operatively coupled to the controller to receive the output signal and provide information representing the current height position of the adjustable bicycle seatpost based on the output signal from the controller.

14 Claims, 4 Drawing Sheets

(56) References Cited

U.S. PATENT DOCUMENTS

| | | | |
|---|---|---|---|
| 2006/0066074 A1* | 3/2006 | Turner | 280/287 |
| 2006/0073945 A1* | 4/2006 | Zuckerman | 482/56 |
| 2006/0280552 A1* | 12/2006 | Turner | 403/345 |
| 2007/0142177 A1* | 6/2007 | Simms et al. | 482/8 |
| 2007/0287597 A1* | 12/2007 | Cameron | 482/8 |
| 2008/0272560 A1* | 11/2008 | Voss | 280/5.5 |
| 2008/0303320 A1* | 12/2008 | Schranz | 297/215.14 |
| 2009/0011656 A1* | 1/2009 | Dal Pra' | 439/669 |
| 2009/0286654 A1* | 11/2009 | Rice | 482/4 |
| 2010/0327542 A1* | 12/2010 | Hara et al. | 280/5.503 |
| 2011/0204201 A1 | 8/2011 | Kodama et al. | |
| 2012/0246958 A1* | 10/2012 | Buckland | 33/701 |

\* cited by examiner

BICYCLE SEAT POSITION INDICATOR

BACKGROUND

1. Field of the Invention

This invention generally relates to a bicycle seat position indicator. More specifically, the present invention relates to a bicycle seat position indicator that provides information representing a detected current height position of an adjustable bicycle seatpost.

2. Background Information

Many bicycles have an adjustable seatpost that can raise or lower a bicycle seat to accommodate users of different heights. An adjustable seatpost typically will include a shaft that supports the bicycle seat. The shaft is slidably secured in, for example, a seat tube of the bicycle frame. Accordingly, the height of the bicycle seat is adjusted when the shaft moves into and out of the seat tube. The seatpost can be capable of adjusting the height of the bicycle seat continuously within a lower and an upper height range, or to different fixed positions within the lower and upper height ranges, as understood in the art.

It may be desirable for a cyclist to know the current height position of the adjustable seatpost. Typically, a cyclist will need to observe the seatpost to determine the position of the seatpost.

SUMMARY

Accordingly, a need exists for a device that can inform the cyclist of the height of the seatpost without requiring the cyclist to observe the seatpost. One aspect therefore is to provide a bicycle seat position indicator that provides information representing a detected current height position of an adjustable bicycle seatpost.

In view of the state of the known technology, a bicycle seat position indicator is provided that comprises a controller and an indicating device. The controller provides an output signal indicative of a current height position of an adjustable bicycle seatpost. The indicating device is operatively coupled to the controller to receive the output signal and provide information representing the current height position of the adjustable bicycle seatpost based on the output signal from the controller.

These and other objects, features, aspects and advantages of the disclosed bicycle seat position indicator will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
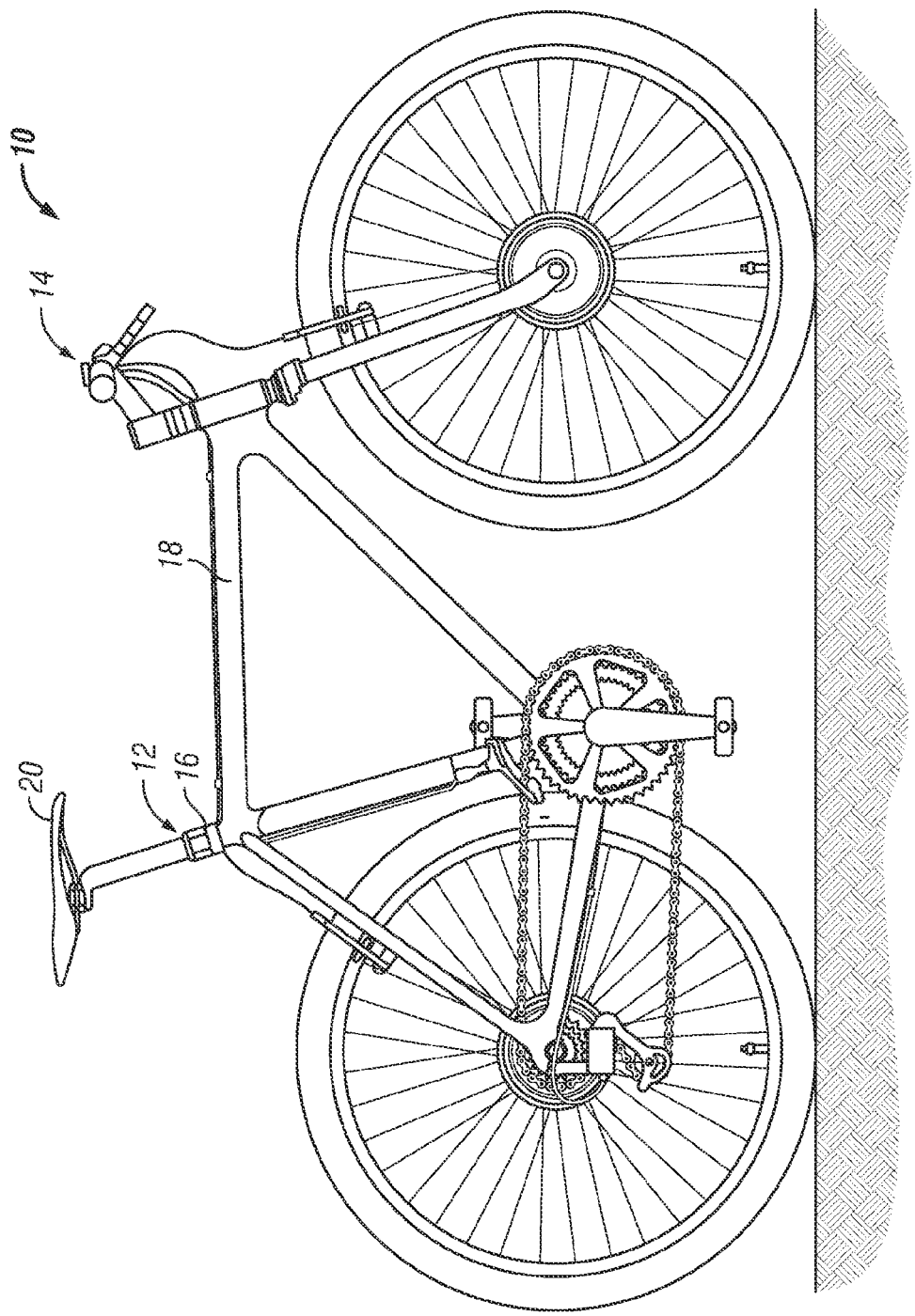
FIG. 1 is a side elevational view of a bicycle that is equipped with an adjustable seatpost and a bicycle seat position indicator in accordance with an illustrated embodiment.

Referring initially to FIG. 1, a bicycle 10 is illustrated that includes an adjustable seatpost 12 and a bicycle seat position indicator 14 according to a disclosed embodiment. The adjustable seatpost 12 can be any suitable type of adjustable seatpost as understood in the art. For example, the adjustable seatpost 12 can be an electrically adjustable seatpost, a hydraulic adjustable seatpost, or an air adjustable seatpost. For purposes of this example, an electrically adjustable seatpost will be described. The adjustable seatpost 12 is removably received in a bicycle seat tube 16 which can be part of the bicycle frame 18. Also, a bicycle seat 20 can be mounted at the top of the adjustable seatpost 12 in any suitable manner.

Figure 2:
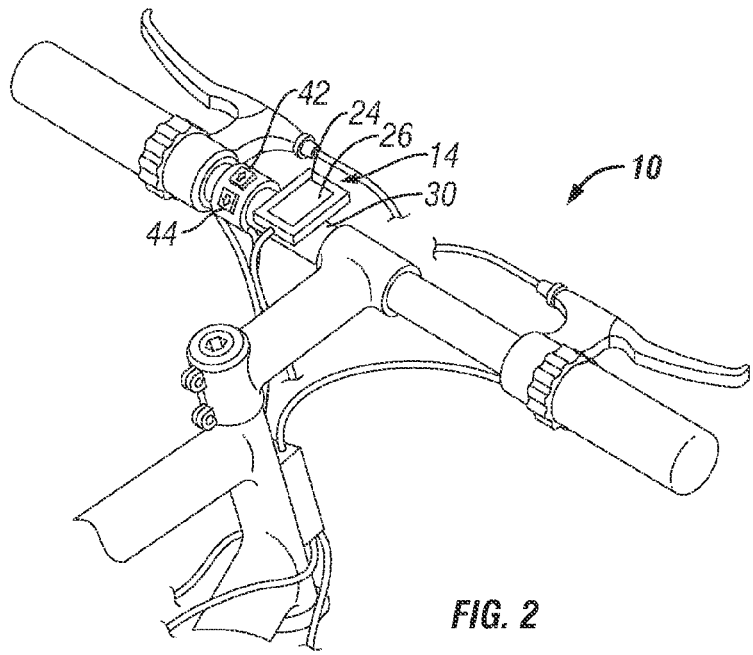
FIG. 2 is an enlarged perspective view of the handlebar area of the bicycle shown in FIG. 1 with an indicating device of the bicycle seat position indicator being mounted to the bicycle handlebar.
Figure 3:
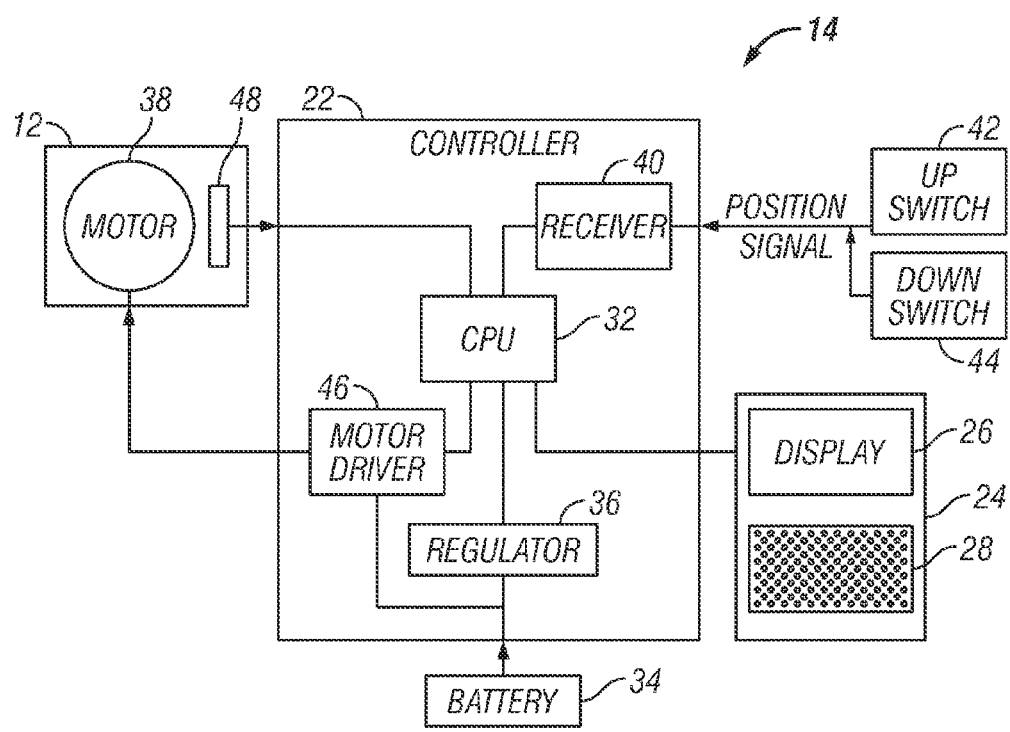
FIG. 3 is a schematic illustrating exemplary components of the bicycle seat position indicator.

As shown in FIGS. 2 and 3, the bicycle seat position indicator 14 includes a controller 22 and an indicating device 24. As will be discussed in more detail below, the controller 22 operates to provide an output signal indicative of a current height position of the adjustable seatpost 12. The indicating device 24 is operatively coupled to the controller 22 to receive the output signal and provide information representing the current height position of the adjustable seatpost 12 based on the output signal from the controller 16. The indicating device 24 can include, for example, a display device 26, which can be a single LED (Light Emitting Diode) device a plurality of LED devices, an LCD (Liquid Crystal Display) device or any other suitable type of display that provides a visual indication of the height of the adjustable seatpost 12 discussed herein. Alternatively, or in addition, the indicating device 24 can include a sound device 28, such as a speaker, that audibly provides the information representing the current height position of the adjustable seatpost 12.

The controller 22 and the indicating device 24 can be configured in a single unit or as separate components as understood in the art. Furthermore, the indicating device 24 can be mounted on the handlebar 30 of the bicycle 10 as shown in FIGS. 1 and 2. As discussed above, the controller 22 can be included in the unit housing the indicating device 24, and thus be mounted on the handlebar 30 with the indicating device 18. Naturally, the controller 22 can be mounted at any suitable location on the bicycle 10. Likewise, the indicating device 24 can be mounted at any suitable location on the bicycle 10 that is readily visible to the rider. Furthermore, the controller 22 and the indicating device 24 can communicate with each other wirelessly or via a wired connection.

Returning now to FIG. 3, as understood by one skilled in the art, the controller 22 preferably includes a microcomputer (CPU) 32 with a control program that controls the bicycle seat position indicator 14 as discussed herein. The controller 22 can also include other conventional components such as an input interface circuit, an output interface circuit, and storage devices such as a ROM (Read Only Memory) device and a RAM (Random Access Memory) device. The RAM and ROM store processing results and control programs that are run by the controller 22. The controller 22 is operatively coupled to the components of the bicycle seat position indicator 14, and to the components of the bicycle 10 as appropriate, in a conventional manner. It will be apparent to those skilled in the art from this disclosure that the precise structure and algorithms for the controller 22 can be any combination of hardware and software that will carry out the functions of the embodiments discussed herein. Naturally, the controller 22 and other components of the bicycle 10 discussed herein can be powered by a battery 34. The controller 22 can also include a regulator 36 or any other suitable power regulating circuitry as understood in the art.

The CPU 32 controls the adjustable seatpost 12 and the indicating device 24. For purposes of this example, the adjustable seatpost 12 can be an electrical adjustable seatpost that is adjusted by a motor 38 as understood in the art. For example, the motor 38 can drive an appropriate gear mechanism to move the adjustable seatpost 12 in and out of the seat tube 16 to raise and lower the bicycle seat 20. That is, the controller 22 includes a receiver 40, such as an intermediate frequency (IF) circuit, radio frequency (RF) circuit, or any other suitable device that receives position signals from control switches. The control switches can include an up switch 42 and a down switch 44 that can be manipulated by a rider to adjust the adjustable seatpost 12 upward or downward. As shown in FIG. 2, the up switch 42 and the down switch 44 can be mounted on the handlebar 30 or at any other suitable location on the bicycle 10. Furthermore, the up switch 42 and the down switch 44 can provide the signals to controller 22 wirelessly or via a wired connection. In this example, the up switch 42 and the down switch 44 wirelessly provide the signals that are received by the receiver 40.

Figure 4:
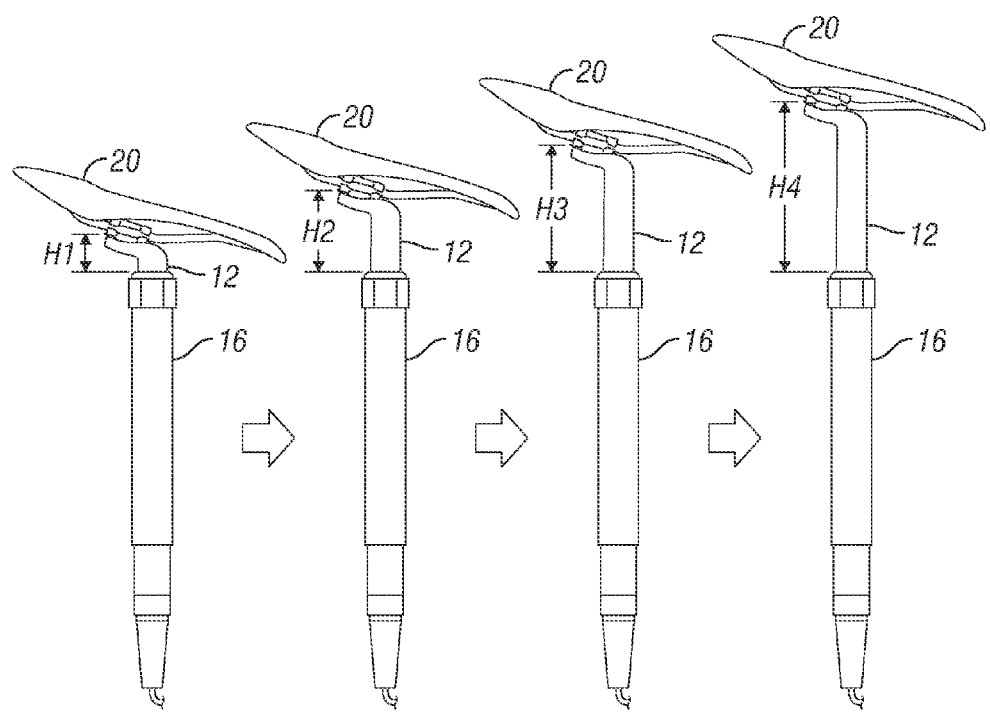
FIG. 4 illustrates different exemplary heights of the adjustable seatpost shown in FIG. 1.

As shown in more detail in FIG. 4, the CPU 32 controls a motor driver 46 based on the signals received from the up switch 42 or the down switch 44 to drive the motor 38. Thus, the motor 38 moves the adjustable seatpost 12 into or out of the seat tube 16. Accordingly, the bicycle seat 20 can be moved from a height H1 up to heights H2, H3 and H4, and back down again to the height H1. In this example, the adjustable seatpost 12 is configured to move to different fixed heights H2, H3 and H4. However, the adjustable seatpost 12 can instead be configured to move continuously within a range between the lowest height H1 and the uppermost height H4 as understood in the art. The fixed height positions are not limited to four height positions, and user may change the height of each fixed height positions by using switch in a setting mode.

As further shown in FIG. 3, a detector 48 is configured to detect the current height position of the adjustable bicycle seatpost 12 and provide an output signal indicative of the current height position of the adjustable bicycle seatpost 12 to the CPU 32. The detector 48 can be an optical detector, an electronic detector (e.g. a potentiometer or a rotary encoder) or any suitable type of detector known in the art.

Details of examples in which the controller 22 controls the indicating device 24 to provide information representing the current height position of the adjustable seatpost 12 will now be explained. As shown in FIGS. 5 through 9, the display device 26 can be configured to display the current height position as a graphic image 50. For example, the display device 26 can display the graphic image 50 in the shape of a bicycle saddle. Moreover, the display device 26 displays at least two graphic images 50, with each of the graphic images 50 being indicative of a prescribed height position. The graphic images 50 are disposed in a line in one direction.

Figures 5, 6:
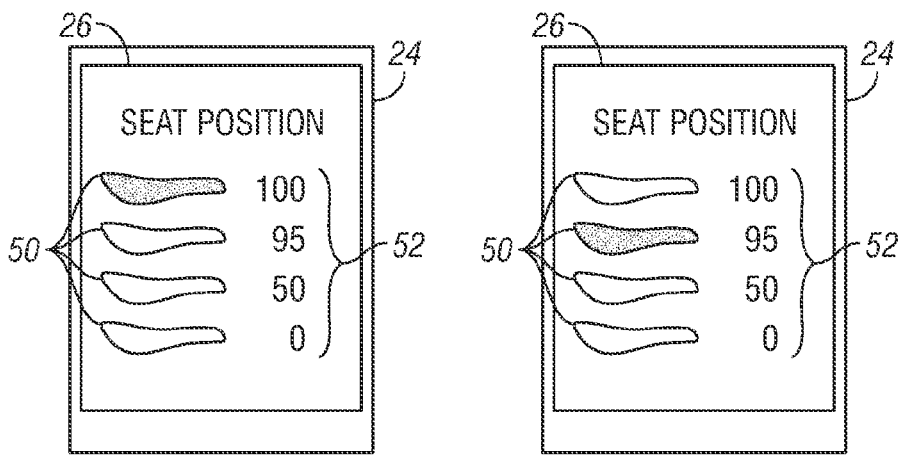
FIG. 5 illustrates an exemplary display by the indicating device which indicates that the adjustable seatpost shown in FIG. 1 is at the highest position.
FIG. 6 illustrates an exemplary display by the indicating device which indicates that the adjustable seatpost shown in FIG. 1 is at a position lower than the highest position.
Figures 7, 8:
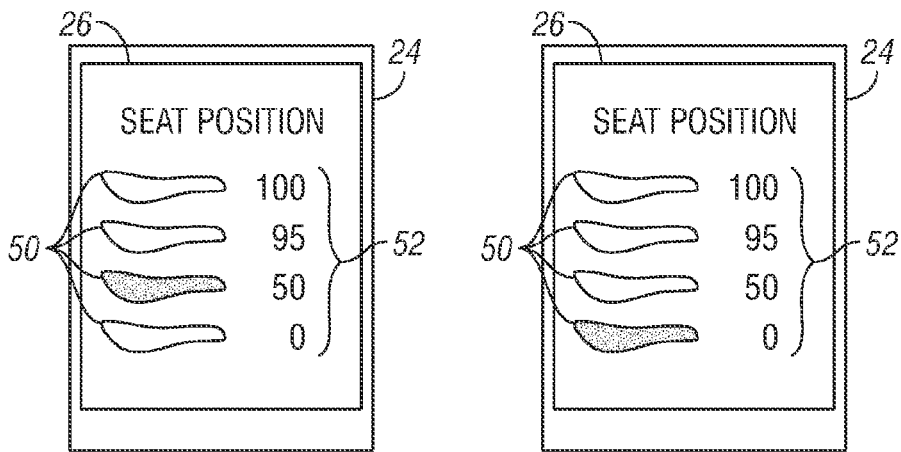
FIG. 7 illustrates an exemplary display by the indicating device which indicates that the adjustable seatpost shown in FIG. 1 is at another position lower than the highest position.
FIG. 8 illustrates an exemplary display by the indicating device which indicates that the adjustable seatpost shown in FIG. 1 is at the lowest position.

In this example, the display device 26 displays four graphic images 50 representing the four heights H1 through H4 of the adjustable seatpost 12 as shown in FIG. 4. The detector 48 provides a signal to the controller 22 representing the detected current height position of the adjustable seatpost 12, and the controller 22 controls the display device 26 to highlight or otherwise identify the graphic image 50 that is indicative of the current height position. Thus, FIG. 5 illustrates when the detector 48 detects the current height position as the height H4, FIG. 6 illustrates when the detector 48 detects the current height position as the height H3, FIG. 7 illustrates when the detector 48 detects the current height position as the height H2, and FIG. 8 illustrates when the detector 48 detects the current height position as the height H1.

The display device 26 can identify the appropriate graphic image 50 in any suitable manner. For example, the display device 26 can highlight the graphic image 50 that is indicative of the current height position by illuminating the graphic image 50 that is indicative of the current height position. The display device 26 can also highlight the graphic image 50 that is indicative of the current height position by flashing the graphic image 50 that is indicative of the current height position. Furthermore, the display device 26 can highlight the graphic image 50) that is indicative of the current height position by providing color (e.g., red) to the graphic image 50 that is indicative of the current height position.

In addition or alternatively to the above types of displays, the display device 26 can display the current height position by an indicium 52, such as numeral or a term, word (High, Middle, Low, etc.) or symbol indicating the position (e.g., heights H1, H2, H3, H4, etc.). Naturally, any of the indicium 52 can instead be permanent indicium that is written or engraved in the display device 26 and corresponds to a respective graphic image 50. Also, in all of the types of displays discussed herein, the display device 26 can display the current height position in a flashing manner by flashing or strobing the graphic image 50 or the indicium (the numeral or term) 52. Furthermore, the display device 26 can display the current height position in different colors for representing different height positions of the adjustable seatpost 12. For instance, the different graphic images 50 and the indicium 52 can be different colors such as yellow, blue, green, red or any other suitable colors.

Figures 9, 10:
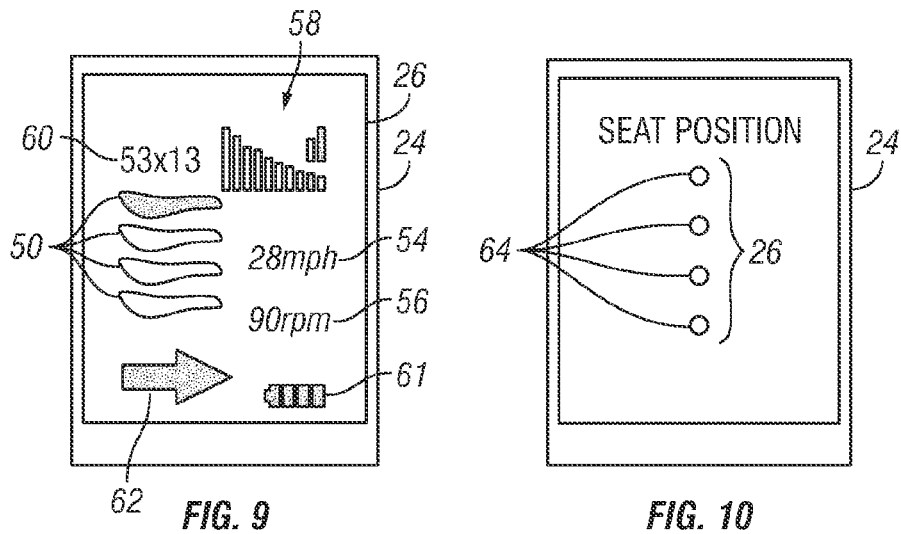
FIG. 9 illustrates an exemplary display by the indicating device which indicates that the adjustable seatpost shown in FIG. 1 is at the highest position and provides additional information such as bicycle speed, crank cadence, gear position, gear ratio and bicycle inclination.
FIG. 10 illustrates another configuration of the indicating device including a plurality of lighting devices.

Also, as shown in FIG. 9, the display device 26 can display the current height position using, for example, a graphic image 50 for an indicium 52), and can display a bicycle speed 54, a crank cadence 56, a gear position 58, a gear ratio 60, an inclination of the bicycle 62 (as indicated by the direction of the arrow), and any other suitable information. The display device 26 can also display a battery charge indicator 61 that indicates the state of charge of the battery 34 as understood in the art. The display device 26 can also display these characteristics in different colors and in a flashing or strobing manner. Furthermore, as shown in FIG. 10, the display device 26 can be as simply as at least one lighting device 64. In this example, the display device 26 includes a plurality of lighting devices 64 such as LEDs. In this configuration, the controller 22 controls the display device 26 to illuminate the lighting device 64 that corresponds to the current height position of the adjustable seatpost 12. Also, the display device 26 can include only one lighting device 64, such as a multicolored LED. In this event, the controller 22 controls the display device 26 to illuminate the display device 64 at a particular color representing a corresponding current height position of the adjustable seatpost 12. Of course, in an arrangement having multiple lighting devices 64, any or all of the lighting devices 64 can be multicolored lighting devices such as multicolored LEDs.

Furthermore, the controller 22 can control the sound device 28 of the indicating device 24 to audibly provide any or all of the information discussed above. For example, the sound device 28 can provide audible information representing the current height position of the adjustable seatpost 12, as well as the bicycle speed, cadence of crank, gear position, gear ratio, inclination of the bicycle and any other suitable information.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "haying" and their derivatives. Also, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle seat position indicator comprising:
   a controller configured to provide an output signal indicative of a current height position of an adjustable bicycle seatpost; and
   an indicating device operatively coupled to the controller to receive the output signal and provide information representing the current height position of the adjustable bicycle seatpost based on the output signal from the controller, the indicating device including a display device which is configured to display at least two graphic images, each of the graphic images being indicative of a respective prescribed height position and the at least two graphic images being physically arranged in order of their respective prescribed height position, the display device being configured to highlight one of the at least two graphic images that is indicative of the current height position.

2. The bicycle seat position indicator according to claim 1, wherein
   the display device is configured to display each of the graphic images in the shape of a bicycle saddle.

3. The bicycle seat position indicator according to claim 1, wherein
   the display device is further configured to display the current height position by a numeral.

4. The bicycle seat position indicator according to claim 1, wherein
   the display device is further configured to display the current height position by a term.

5. The bicycle seat position indicator according to claim 1, wherein
   the display device is further configured to display the current height position in a flashing manner.

6. The bicycle seat position indicator according to claim 1, wherein
   the display device is further configured to display the current height position in different colors for representing different height positions of the adjustable bicycle seatpost.

7. The bicycle seat position indictor according to claim 1, wherein
   the display device is further configured to display more than at least two of the graphic images physically arranged in an ascending order of their respective prescribed height position with the respective prescribed height position that is physically lowest being represented at a bottom of the ascending order and the respective prescribed height position that is physically highest being represented at a top of the ascending order.

8. The bicycle seat position indicator according to claim 1, wherein
   the display device is configured to highlight one of the at least two graphic images that is indicative of the current height position by illuminating the one of the at least two graphic images that is indicative of the current height position.

9. The bicycle seat position indicator according to claim 1, wherein
   the display device is configured to highlight one of the at least two graphic images that is indicative of the current height position by flashing the one of the at least two graphic images that is indicative of the current height position.

10. The bicycle seat position indicator according to claim 1, wherein
    the display device is further configured to highlight one of the at least two graphic images that is indicative of the current height position by providing color to the one of the at least two graphic images that is indicative of the current height position.

11. The bicycle seat position indicator according to claim 1, wherein
    the display device is further configured to display the current height position and at least one of bicycle speed, cadence of clank, gear position, gear ratio and inclination of the bicycle.

12. The bicycle seat position indicator according to claim 1, further comprising a detector configured to detect the current height position of the adjustable bicycle seatpost and provide an output signal indicative of the current height position of the adjustable bicycle seatpost.

13. The bicycle seat position indicator according to claim 1, wherein the indicating device further includes a sound device that audibly provides the information representing the current height position of the adjustable bicycle seatpost.

14. The bicycle seat position indicator according to claim 1, wherein the information provided by the indicating device represents an actual physical current height position of the adjustable bicycle seatpost with reference to a seat tube with which the adjustable bicycle seatpost is movably coupled.

* * * * *